United States Patent
Sodagar

(10) Patent No.: US 12,206,749 B2
(45) Date of Patent: Jan. 21, 2025

(54) DEPLOYMENT OF WORKFLOW TASKS WITH FIXED PRECONFIGURED PARAMETERS IN CLOUD-BASED MEDIA APPLICATIONS

(71) Applicant: TENCENT AMERICA LLC, Palo Alto, CA (US)

(72) Inventor: Iraj Sodagar, Los Angeles, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 18/414,917

(22) Filed: Jan. 17, 2024

(65) Prior Publication Data

US 2024/0163348 A1    May 16, 2024

Related U.S. Application Data

(63) Continuation of application No. 18/301,810, filed on Apr. 17, 2023, now Pat. No. 11,917,034.

(60) Provisional application No. 63/332,614, filed on Apr. 19, 2022.

(51) Int. Cl.
*H04L 47/80* (2022.01)
*H04L 67/60* (2022.01)

(52) U.S. Cl.
CPC .................................. *H04L 67/60* (2022.05)

(58) Field of Classification Search
None
See application file for complete search history.

(56) References Cited

U.S. PATENT DOCUMENTS

| | | | |
|---|---|---|---|
| 2019/0222621 A1* | 7/2019 | Kolan | H04L 67/04 |
| 2020/0177694 A1* | 6/2020 | Kolan | H04L 67/566 |
| 2020/0412837 A1 | 12/2020 | Sodagar | |
| 2021/0105338 A1* | 4/2021 | Oyman | H04L 12/2876 |
| 2021/0400097 A1 | 12/2021 | Sodagar | |
| 2022/0147197 A1* | 5/2022 | Tross | G06F 40/103 |

FOREIGN PATENT DOCUMENTS

| | | | | |
|---|---|---|---|---|
| CN | 115867891 A | * | 3/2023 | G06F 8/61 |
| WO | WO 2020/188140 A1 | | 9/2020 | |

OTHER PUBLICATIONS

"Revised text of ISO/IEC FDIS 23090-8 2nd edition Network-based Media Processing"; FDIS Stage; ISO proposal; ISO/IEC JTC 1/SC 29/WG 03 N0489; Feb. 5, 2022; 284 pages.
PCT Notification of Transmittal of the International Search Report and the Written Opinion of the International Searching Authority, or the Declaration for the priority application No. PCT/US23/065875, 19p.

* cited by examiner

*Primary Examiner* — Natisha D Cox
(74) *Attorney, Agent, or Firm* — Crowell & Moring LLP

(57) ABSTRACT

This disclosure generally relates to media application development and deployment using an NBMP system. More specifically, this disclosure describes methods and apparatuses for instance level configuration of functions used in NBMP workflows. Example mechanisms are provided for configuring different instances of a same function in various tasks in a media processing workflow with customized configurations and restrictions based on a format of a general configuration descriptor of the function.

20 Claims, 5 Drawing Sheets

DEPLOYMENT OF WORKFLOW TASKS WITH FIXED PRECONFIGURED PARAMETERS IN CLOUD-BASED MEDIA APPLICATIONS

INCORPORATION BY REFERENCE

This application is a continuation of and claims the benefit of priority to U.S. patent application Ser. No. 18/301,810, filed on Apr. 17, 2023, which is based on and claims the benefit of priority to U.S. Provisional Application No. 63/332,614 filed on Apr. 19, 2022, which are herein incorporated by reference in their entireties.

TECHNICAL FIELD

This disclosure generally relates to media streaming technologies using Network-Based Media Processing (NBMP). More specifically, this disclosure describes methods and apparatuses for instance level configuration of functions used in NBMP workflows.

BACKGROUND

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

A network and cloud platform may be used to run various media applications. A Network Based Media Processing (NBMP) system provides a platform for defining, instantiating, and running workflows on cloud-based environments. Such workflows can be run in parts, task by task, or a group of tasks at each time. NBMP shows a great potential to increase media processing efficiency, faster and lower-cost deployment of media services, and the ability to provide large scale deployment by leveraging public, private or hybrid cloud services. In NBMP, various multimedia service providers and network/cloud service providers can to cooperate to provide customized immersive media services to customers.

SUMMARY

This disclosure generally relates to media application development and deployment using an NBMP system. More specifically, this disclosure describes methods and apparatuses for instance level configuration of functions used in NBMP workflows. Example mechanisms are provided for configuring different instances of a same function in various tasks in a media processing workflow with customized configurations and restrictions based on a format of a general configuration descriptor of the function.

In some example implementations, a signaling method for generating an NBMP workflow in a cloud-based platform for a media processing application is disclosed. the method may include determining an NBMP task among a plurality of NBMP tasks in an NBMP workflow of the media processing application; identifying a function from a function repository to be used by the NBMP task; associating the function with an instance identifier, the instance identifier uniquely distinguishing an instance of the function in the NBMP task from other instances of the function in other NBMP NBMP tasks among the plurality of tasks; obtaining a configuration descriptor data structure of the function from the function repository; determining a set of restrictions for the instance of the function in the NBMP task; generating a function-restrictions data structure by applying the set of restrictions to and use a same format as the configuration descriptor data structure, the function-restrictions data structure being uniquely identified by the instance identifier; and constructing a process descriptor for the NBMP workflow comprising the function-restrictions data structure pared with the instance identifier for signaling instance-dependent restrictions of the function to an NBMP workflow manager.

In the example implementations above, the configuration descriptor data structure comprises a set of instance-independent parameter configurations for the function.

In any one of the example implementations above, the set of instance-independent parameter configurations comprise a set of parameter ranges for parameters associated with the function.

In any one of the example implementations above, at least one parameter range among the set of parameter ranges comprises a numerical value range.

In any one of the example implementations above, at least one parameter range among the set of parameter ranges comprises a set of optional choices.

In any one of the example implementations above, the set of restrictions comprise further instance-dependent limitations to the set of parameter ranges.

In any one of the example implementations above, at least one of the set of restrictions comprises limiting at least one of the parameters associated with the function to a single numerical value.

In any one of the example implementations above, at least one of the set of restrictions comprises limiting at least one of the parameters associated with the function to a single choice.

In any one of the example implementations above, the method may further include identifying a plurality of functions to be used by the plurality of NBMP tasks from the function repository, usage of each function in each task being attributed to a unique function instance; and constructing a connection map between the function instances as part of the process descriptor, each of the function instances being associated with a unique function instance identifier In some other example implementations, a method for generating an NBMP workflow in a cloud-based platform for a media processing application is disclosed. The method may include receiving an NBMP workflow descriptor document; extracting from the NBMP workflow descriptor document a function restriction data structure associated with a function from a function repository and extracting an instance identifier attributed to the function restriction data structure, the instance identifier uniquely identifying an instance of use of the function in an NBMP task of the NBMP workflow and the function restriction data structure being instance-dependent and being constructed following a format of a configuration descriptor data structure for the function in the function repository; extracting from the function restriction data structure a set of instance-dependent restrictions on the function; and generating the NBMP workflow according to the NBMP workflow descriptor document and the instance-dependent restrictions on the function.

Aspects of the disclosure also provide an electronic device or system or including a circuitry or processor to executed computer instructions form a memory to carry out any one of the method implementations above.

Aspects of the disclosure also provide non-transitory computer-readable mediums storing instructions which when executed by electronic device or system are configure to cause the electronic device or system to perform any one of the method implementations above.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Cloud Computing Environment for Media Processing

Figure 1:
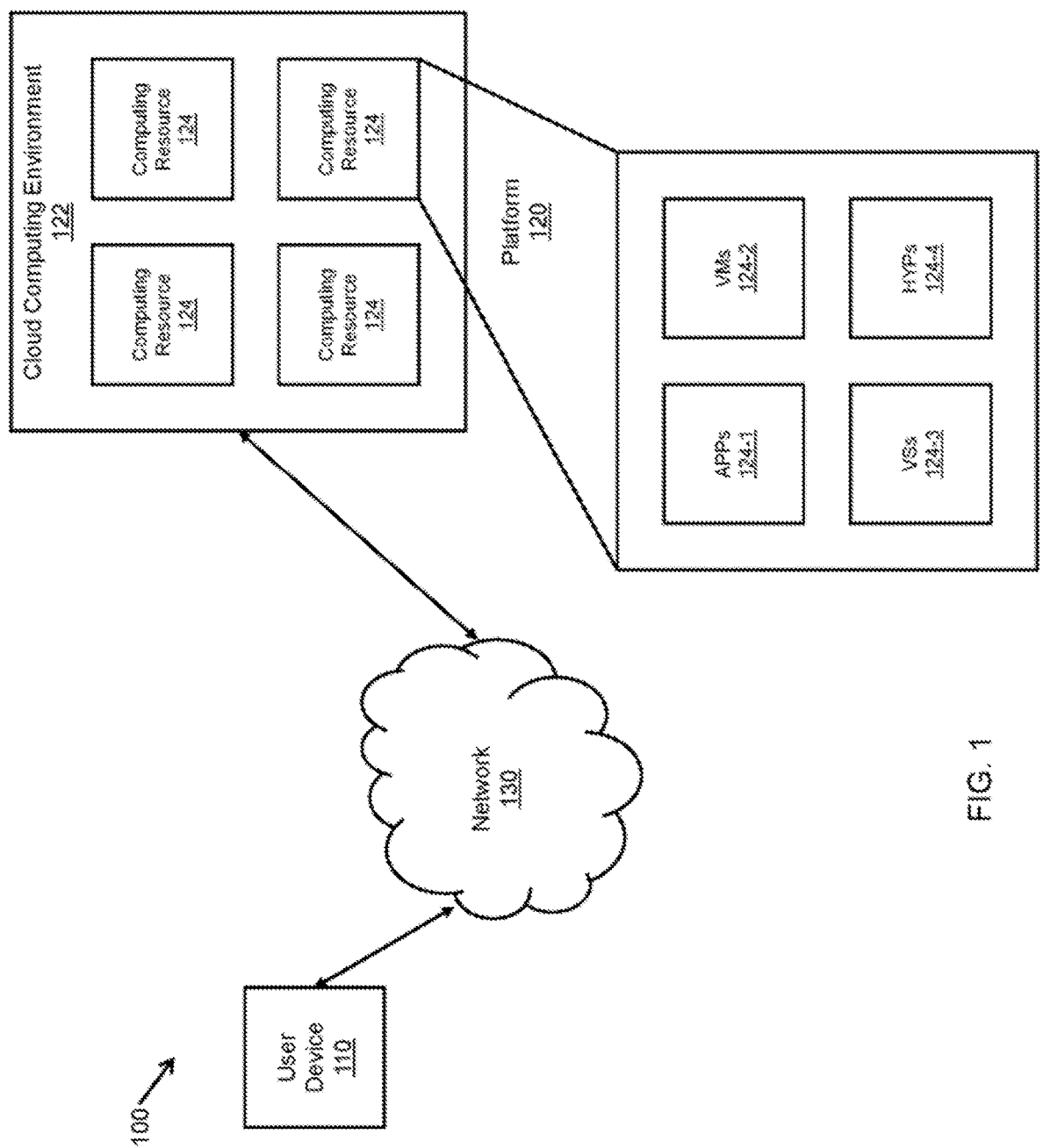
FIG. 1 is an example schematic illustration of a media communication system applicable to media applications, according to one or more embodiments of the present disclosure.

FIG. 1 illustrates a diagram of an example computing environment 100 in which methods, apparatuses, and systems described herein may be implemented, according to various example embodiments below. As shown in FIG. 1, the computing environment 100 may include one or more user device 110 (described in singular form below merely for simplicity), a computing platform 120, and a communication network 130. Vary devices and components of the environment 100 may interconnect via wired connections, wireless connections, or a combination of wired and wireless connections of the communication network 130.

The user device 110 includes one or more devices capable of receiving, generating, storing, processing, and/or providing information associated with the computing platform 120. For example, the user device 110 may include a computing device (e.g. a desktop computer, a laptop computer, a tablet computer, a handheld computer, a smart speaker, a server, etc.), a mobile phone (e.g. a smart phone, a radiotelephone, etc.), a wearable device (e.g. a pair of smart glasses or a smart watch), or a similar device. In some implementations, the user device 110 may receive information from and/or transmit information to the platform 120.

The computing platform 120 includes one or more devices as described elsewhere herein. In some implementations, the computing platform 120 may include a cloud server or a group of cloud servers. The cloud server or the group of cloud servers may be centrally located or may be geographical distributed. In some implementations, the computing platform 120 may be designed to be modular such that software components may be swapped in or out depending on a particular need. As such, the computing platform 120 may be easily and/or quickly reconfigured for different uses.

In some implementations, as shown in FIG. 1, the computing platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 may be configured to host the platform 120. The cloud computing environment 122 may provide computation processing, software, data access, storage, etc. services that do not require end-user's (e.g., the user device 110) knowledge of a physical location and configuration of system(s) and/or device(s) that hosts the computing platform 120. As shown in the example of FIG. 1, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may be provided to the computing platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 may include a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 may include one or more software applications that may be provided to or accessed by the user device 110 and/or the computing platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 may include a software implementation of a machine (e.g., a computer) that executes programs like a physical machine. The virtual machine 124-2 may be either a system virtual machine or a process virtual machine, depending upon its level of use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage various aspect of the infrastructure of the cloud computing environment 122, such as data management, synchronization, or long-duration data transfers.

The virtualized storage 124-3 may include one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in managing storage for end users. File virtualization may help eliminate dependencies between data accessed at a file level and a location where files are physically stored. The elimination of such dependencies may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 may include one or more wired and/or wireless networks. For example, the network 130 may include a cellular network (e.g. a fifth generation (5G) network, a long-term evolution (LTE) network, a third generation (3G) network, a WiMax network, a code division multiple access (CDMA) network, etc.), a Wi-Fi network, a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or different arrangement of devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
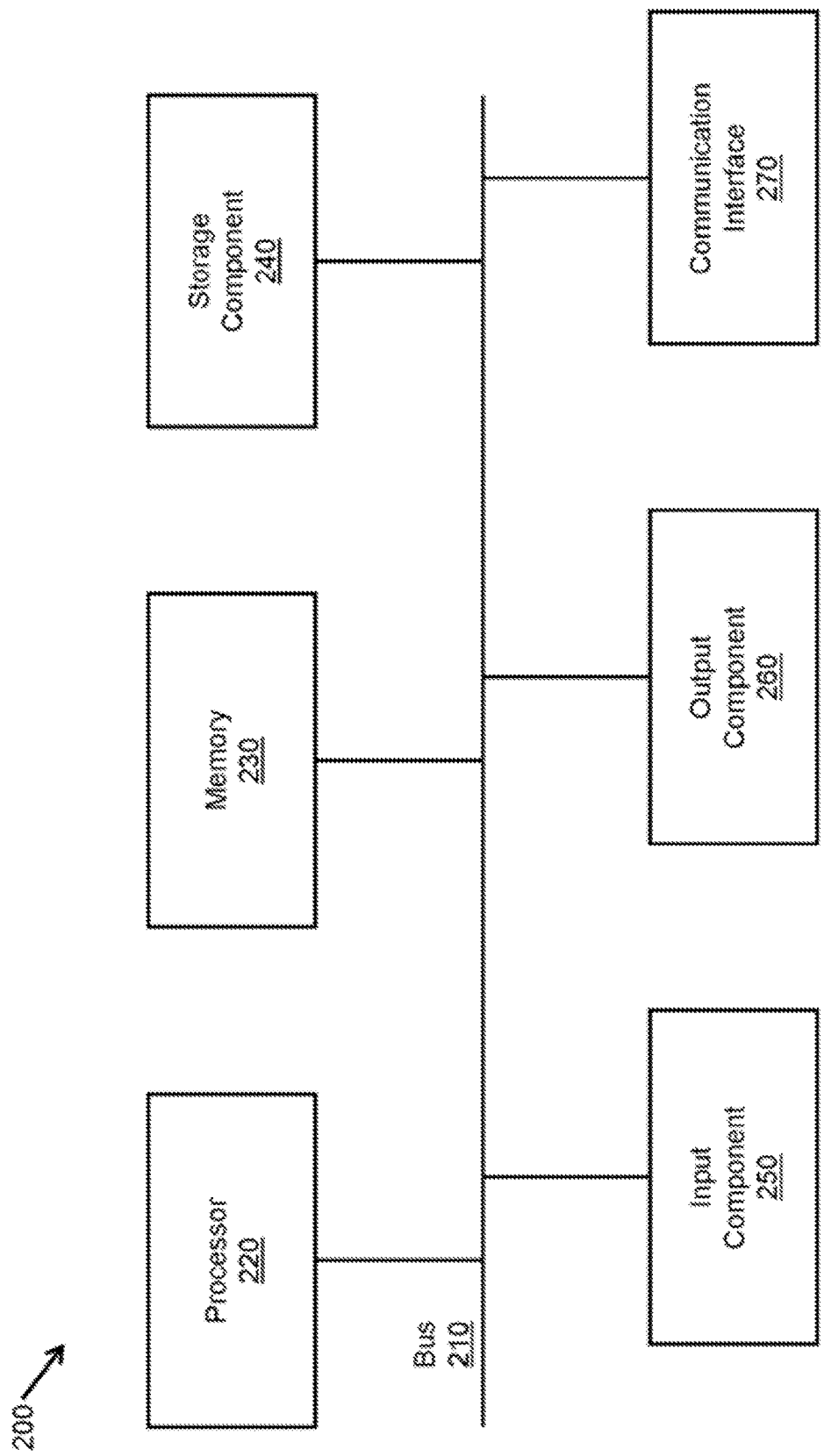
FIG. 2 illustrates an example computing environment for media applications.

FIG. 2 shows a block diagram of example components of one or more devices of FIG. 1. The device 200 may correspond to the user device 110 and the computing platform 120 and any component thereof. As shown in FIG. 2, the device 200 may include a communication bus 210, a processor 220, a memory 230, a storage component 240, an input component 250, an output component 260, and a communication interface 270.

The communication bus 210 may include a component that permits communication among the components of the device 200. The processor 220 may be implemented in hardware, firmware, or a combination of hardware and software. The processor 220 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 may include one or more processors capable of being programmed to perform a function. The memory 230 may include a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing environment information (e.g., a global positioning system (GPS) component, an accelerometer, a gyroscope, and/or an actuator). The output component 260 may include a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more media processes described herein. Thus, implementations described herein are not limited to any specific combination of hardware circuitry and software.

The number and arrangement of components shown in FIG. 2 are provided merely as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Network Based Media Processing

Media information may be cloudified, including both media storage and media processing, and in, for example, the example cloud computing environment described. Cloud processing of media may generally include retrieving inputs from media sources, processing the inputs according to one or more workflows and generating one or more outputs that are sent to a media sink or destination. Cloudification of media processing workflows may help achieve higher resource efficiency, ensure scalability, and provide faster, larger-scale, and lower-cost deployment of media services. Cloud-based media processing may be particular suited for efficiently handling various newly developed media contents, services, experiences, and processing tools, including but not limited to Virtual Reality (VR), Augmented Reality (AR), contents of 3-D or higher, and Artificial Intelligence (AI) tools.

An example of such platforms may be referred to as Network Based Media Processing (NBMP). In NBMP, a media service provider may need to deploy their workflows across different cloud platforms and geographical locations. A workflow may be configured to run of various media processing functions in a mix of the cloud, the edge, and on-premise gateways. In some example implementations, microservices design patterns may be adopted in NBMP for higher scalability, reusability, decoupling, testability of the different media processing functions.

In some implementations, a NBMP platform may be designed to provide a unified abstraction layer for composing, controlling, managing, and monitoring flexible media processing workflows, independent of (or agnostic to) an underlying cloud infrastructure or platform. An NBMP layer may define the architecture, APIs, media and metadata formats for discovering media processing functions, describing media workflows, deploying media processing workflows, configuring the runtime tasks, monitoring faulty behavior and taking remedial measures.

For ease of description, this disclosure adopts terms and names as described below:

Function Description: description of the details of a Media Processing Function, such as input and output description details, requested media processing, requirements, etc.

Function Repository: storage place where NBMP functions are retrieved from by an NBMP workflow manager or NBMP source.

Media Processing Entity: entity that runs one or more media processing task(s)

Media Resource: media data that is captured by the Media Source and is sent to the Media Processing Entities of the NBMP system.

Media Sink: entity that consumes the output of the NBMP Workflow through existing delivery methods.

Media Source: entity that provides the raw media content to be processed, such as a digital camera, a microphone, an encoder, or persistent storage.

NBMP Format: media format that is exchanged between the Media Source and the Media Processing Entities in an NBMP system, and between individual Media Processing Entities inside the NBMP system.

NBMP Function: Implementation of a standalone and self-contained media processing operation and the corresponding description of that operation.

NBMP Publish Format: media format of the content that is sent from Media Processing Entity to Media Sink.

NBMP Source: entity that provides triggers and describes media processing in the network.

NBMP System: system for processing media across one or more processing entities in the network and consisting of a Media Source, a NBMP Source, a NBMP Workflow Manager, a Function Repository, Media Processing Entity(ies) and Media Sink(s).

NBMP Workflow: one or more connected Task(s) that achieve the requested media processing, which may be presented in various forms.

NBMP Workflow Manager: entity that provisions tasks and connects them to create a complete workflow based on a workflow description and function descriptions Supplementary Information: metadata or auxiliary information related to the media data or media processing operations.

Task: runtime instance of NBMP Function that gets executed inside a Media Processing Entity.

Task Description: description of the runtime details of a Task, such as input and output description details, requirements, configuration information etc.

Workflow Description: description of the details of the media processing, such as input and output description details, requested media processing, requirements etc. for the workflow.

Figure 3:
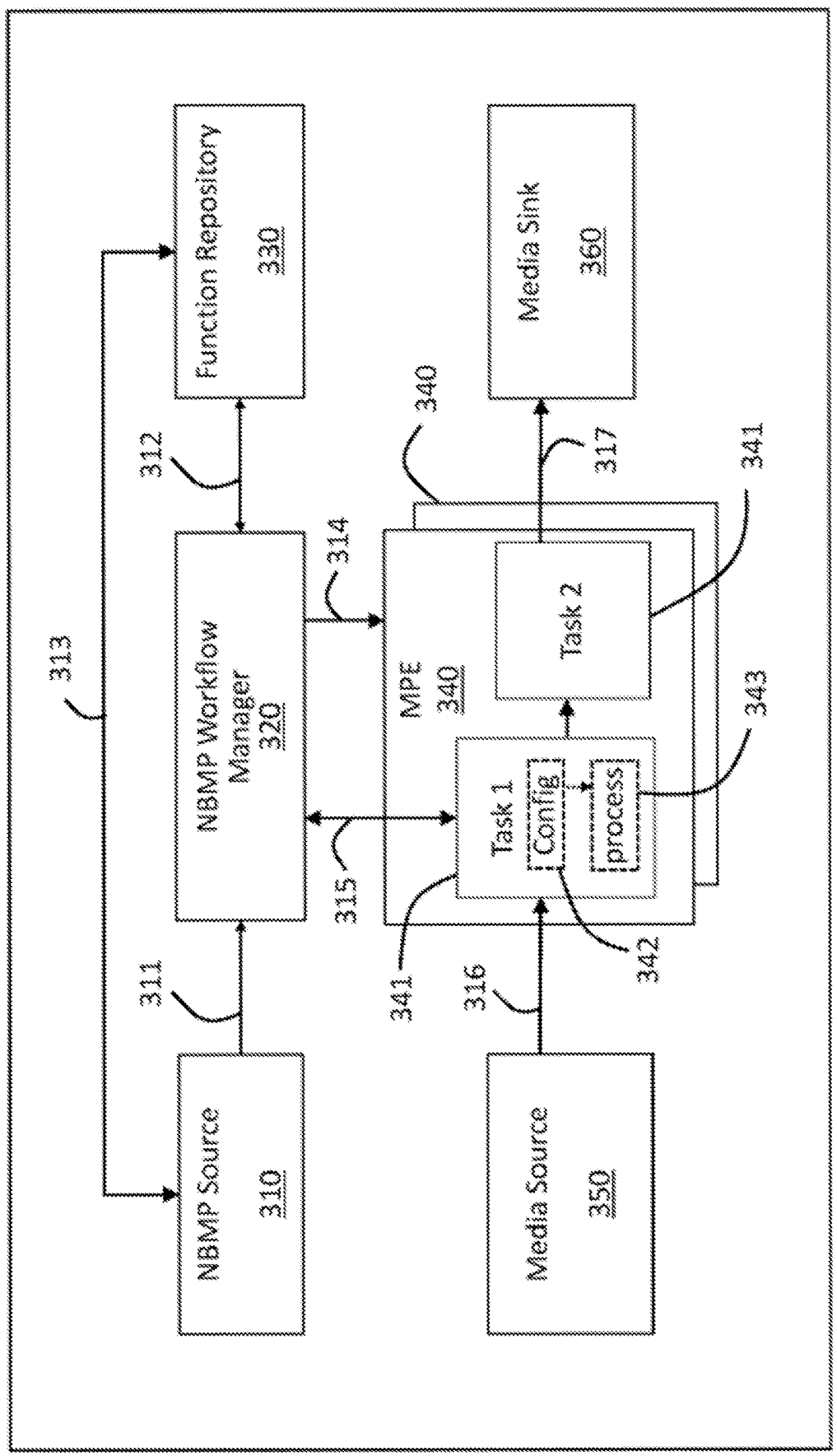
FIG. 3 illustrates an example block diagram of an NBMP system, according to one or more embodiments of the present disclosure.

FIG. 3 shows an example NBMP system 300. As illustrated in FIG. 3, the NBMP system 300 may include one or more NBMP sources 310, an NBMP workflow manager 320, one or more function repositories 330, one or more Media Processing Entities (MPE) 340, one or more media sources 350, and one or more media sinks 360. The NBMP source 310, NBMP workflow manager 320, function repository 330, MPE 340, media source 350, and media sink 360 may include or be implemented by at least one or more processors and memory that store code configured to cause the at least one or more processors to perform the functions of the NBMP source 310, NBMP workflow manager 320, function repository 330, MPE 340, media source 350, and media sink 360, respectively.

The NBMP source 310 may request the NBMP workflow manager 320 to create workflow including tasks to be performed by the one or more media processing entities (MPE) 340 by sending a workflow description document (WDD) to the NBMP workflow manager 320. The WDD may include several descriptors, each of which may include several parameters. These descriptors may include details such as input and output data, required functions, and requirements for the workflows. The WDD may include a set of task descriptions in the task descriptors and a connection map of the tasks that connects inputs and outputs of the tasks to be performed by one or more of the media processing entities 340. When the NBMP workflow manager 320 receives such information from the NBMP source 310, the NBMP workflow manager 320 may create the workflow by instantiating the tasks based on function names and connecting the tasks in accordance with the connection map.

The NBMP source 310 may communicate the WDD to the NBMP workflow manager 320 via an NBMP workflow API 311. The NBMP source 310 may also communicate function descriptions with the function repository 330 via a function discovery API 313 to obtain function description of functions stored in the function repository 330. These functions may include media processing functions stored in the function repository 330, and may include, for example, functions for media decoding, feature point extraction, camera parameter extraction, projection method, seam information extraction, blending, post-processing, and encoding. The NBMP workflow manager 320 may communicate with the function repository 330 via a function discovery API 312, which may be a same or different API from the function discovery API 313, and may further communicate with one or more of the MPE 340 via an API 314 (e.g., an MPE API).

In some example implementations, the NBMP source 310 may request the NBMP workflow manager 320 to create workflow by using a set of keywords. For example, NBMP source 310 may send the NBMP workflow manager 320 a WDD that may include a set of keywords that the NBMP workflow manager 320 may use to identify appropriate functions stored in the function repository 330. When the NBMP workflow manager 320 receives such information from the NBMP source 310, the NBMP workflow manager 320 may create the requested workflow by searching for appropriate functions using the keywords that may be specified in a Processing Descriptor of the WDD and use other descriptors in the WDD to prescribe tasks and connect the tasks to create the workflow.

The NBMP workflow manager 320 may use the API 314 to setup, configure, manage, and monitor one or more tasks 341 of a workflow that is performable by the one or more MPEs 340. In some example implementations, the NBMP workflow manager 320 may use the API 314 to update and destroy the tasks. In order to configure, manage, and monitor tasks 341 of the workflow, the NBMP workflow manager 320 may send messages, such as requests, to one or more of the MPEs 340, wherein each message may have several descriptors, each of which have several parameters. The tasks 341 may each include media processing functions 342 and configurations 343 for the media processing functions 342.

The MPEs 340 may provision one or more tasks 341. The NBMP workflow manager 320 may communicate with the tasks 341 via API 315 (e.g., an NBMP Task API). The NBMP workflow manager 320 may use the API 315 to setup, configure, manage, and monitor one or more tasks 341 of a workflow that is being performed by the one or more MPE 340. In order to configure, manage, and monitor tasks 341 of the workflow, the NBMP workflow manager 320 may send messages, such as requests, to one or more of the MPE 340 and/or the tasks 341, wherein each message may have several descriptors, each of which may be associated with several parameters. Additionally, the communications between the NBMP source 310, the NBMP workflow manager 320, the function repository 330, and the MPE 340 may form a control flow.

The tasks 341 may each invoke media processing functions 343 according to configurations 342 for the media processing functions 343. Each of the tasks 341 in a respective media processing entity 340 may also communicate with each other to facilitate data flow between tasks. In some example implementations, the NBMP workflow manager 320 may select the tasks based on the descriptions of the tasks in the WDD to search the function repository 330, via the function discovery API 312, to identify appropriate functions to run as tasks 341 for a current workflow. The one or more MPE 340 may be configured to receive media content from the media source 350, process the media content in accordance with the workflow, including processing the media in tasks 341, and output the processed media content to the media sink 360. In some example implementations, the one or more MPE 340 may be provided in parallel for multiple media flows 316 and 317 between the media source 350 and the media sink 360, respectively.

The media source 350 may be configured to store media and may be integrated with or separate from the NBMP source 310. In some example implementations, the NBMP workflow manager 320 may notify the NBMP source 310 when a workflow is prepared and the media source 350 may transmit media content to the one or more MPE 340 based on the notification and the one or more MPE 340 may run the corresponding tasks and process the media content, generate the output, and transmit the output media to the media sink 360. The communications between the media source 350, the MPE 340, and the media sink 360 may form a data flow (as opposed to the control flow described above).

Function Configuration in Function Repository

The function repository described above and shown as component 330 in FIG. 3 is critical in that it supplies the functions and tools that are used by the various tasks instantiated by the MPE 340 for a workflow. Each of the functions in the function repository 330 may be associated with a function description. Each function description may be stored in the function repository as a data structure according to a predefined format. Such data structure may be referred to as a function descriptor. A function descriptor, for example, many include description of parameters associated with the corresponding function, the configuration of the parameters including their types, ranges, etc. Such configuration description may be referred to as configuration descriptor of a function.

For example, a transcoder function identified by "TRANS-VIDEO-292518" may have example predefined configuration parameters shown in Table 1 below:

TABLE 1

| Parameter | Valid range | Comment |
|---|---|---|
| codec | "AVC", "HEVC", "VVC" | Coding standard |
| width | 16-15360 | Resolution in pixels |
| height | 16-8640 | Resolution in pixels |
| bitrate | 100-100, 000 | In kilobits/sec |

The ranges of the various parameters provide general restriction of the choice of parameters for this transcoder function.

In an example implementation, a corresponding configuration description data structure may be constructed as:

List 1

```
{
  "parameters" : [
    {
      "name": "codec",
      "id": 1,
      "description": "codec type",
      "datatype": "string",
      "values": [
        {
          "name": "AVC",
          "id": 11,
          "restrictions": [" "]
        },
        {
          "name": "HEVC",
          "id": 12,
          "restrictions": [" "]
        },
        {
          "name" : "VVC",
          "id": 13,
          "restrictions": [" "]
        }
      ]
    },
    {
      "name": "width",
      "id": 2,
```

List 1

```
"description": "width in pixels",
"datatype": "integer",
"values": [
  {
    "name": "width",
    "id": 21,
    "restrictions": {
      "min-value": 16,
      "max-value": 15360
    }
  }
]
},
{
"name": "height",
"id": 3,
"description": "height in pixels",
"datatype": "integer",
"values": [
  {
    "name": "height",
    "id": 31,
    "restrictions": {
      "min-value": 16,
      "max-value": 8640
    }
  }
]
},
{
"name": "bitrate",
"id": 4,
"description": "bitrate in kb/sec",
"datatype": "integer",
"values": [
  {
    "name": "bitrate",
    "id": 41,
    "restrictions": {
      "min-value": 100,
      "max-value": 100000
    }
  }
]
}
]
}
```

Function-Instance-Aware Workflow Description Document (WDD)

As described above, a WDD may be provided by the NBMP source 310 to the NBMP workflow manager 320 for generating the workflows according to the WDD. The WDD thus contains all information that may be needed for the NBMP workflow manager 320 to identify functions needed from the function repository 330 and determine the relationship between various tasks.

Among various data items, a WDD may include a processing descriptor that specifies the tasks, the connection between various tasks, and functions used by each of the tasks. For example, the processing descriptor may include a connection map for task/function objects that specifies relationship between the various tasks/functions (input-output relationships, for example).

In some example implementations, the same function from the function repository 330 of FIG. 3 may be used in multiple tasks. The use of the same function in each of the multiple tasks may be treated as separate instances of the same function, and thus may be attributed with an instance identifier in the WDD. As such, a function in a task may be identified by at least two parameters: task/function identifier which uniquely identifies the corresponding task or the function that is used, and an instance identifier, which is used if two or more tasks use the same function. In such a manner, the instance identifier identifies a specific instance of a function that is used for a task.

In one particular example, the transcoder function above, "TRANS-VIDEO-292518", may be used by two tasks, "task-1" and "task-2". The two tasks may be connected as "from" task-1 to "task-2" (meaning, for example, output of task-1 goes to input of task-2). An example task/function connection map element is shown in List 2 below.

List 2

```
"from": {
    "id": "TRANS-VIDEO-292518",
    "instance": "task-1",
    "port-name": "12"
},
"to": {
    "id" : "TRANS-VIDEO-292518"
    "instance": "task-2",
    "port-name" : "12"
}
```

In the example above, the first task happens to be connected to the second task. Both tasks use the same function. However, to be identified from each other, each of the same function in the two tasks includes a unique "instance" value as an instance identifier. As described in further detail below, differentiating different instances of the same function may facilitate adaptive function configuration for the tasks and allow for differentiating configurations for the same function but distinct instances instantiated in different tasks.

In some further example implementations, the processing descriptor may further include an array of function-restrictions objects. Each function-restrictions object may define the specific restrictions that are applied to a function. Various types of restrictions may be imposed on a function. Correspondingly, each function-restrictions object may include several different objects each associated with one type of restrictions to the functions. Some of these types of restrictions may be general and instance-independent. The corresponding objects thus may not need to be associated with any specific instance identifier of the function. However, some other types of restrictions may be instance-dependent, and thus objects associated with those restriction types may be further tagged by function instance identifier.

One of the various types of restrictions may be related to parameter restrictions for the function. Such parameter restrictions, for example, may concern a set of limitation on the parameter ranges and the like.

As an example for parameter restrictions, for the transcoder function identified by "TRANS-VIDEO-292518", as described above, the value ranges of the various parameters may be restrained to a subset of the general ranges of the parameters as specified by the configuration description in the function repository, as shown in Table 1. An example restriction may yield the parameter ranges configuration for "TRANS-VIDEO-292518" as shown in Table 2 below to be applied when being used in a particular task:

TABLE 2

| Parameter | Valid range |
| --- | --- |
| codec | "HEVC" |
| width | 1920 |

TABLE 2-continued

| Parameter | Valid range |
|---|---|
| height | 1080 |
| bitrate | 3000 |

Such parameter restrictions may be instance-dependent. As such, a parameter restriction object under the higher-level function restrictions object for such parameter restrictions may be associated with a particular instance identifier. Such a parameter restriction object may include a data structure for describing the parameter restrictions. As an example, such a data structure may be similar in form to the configuration descriptor described above in relation to List 1 for function configuration description within the function repository.

For example, particular parameter restrictions description in a parameter restriction object within the function-restrictions object in the array of function-restrictions objects associated with a particular instance of functions having the parameter restrictions of Table 2 may be described using the data structure of List 3 below:

List 3

```
{
"parameters": [
  {
    "name": "codec",
    "id": 1,
    "description": "codec type",
    "datatype": "string",
    "values": [
      {
        "name": "HEVC",
        "id": 12,
        "restrictions": [" "]
      }
    ]
  },
  {
    "name": "width",
    "id": 2,
    "description": "width in pixels",
    "datatype": "integer",
    "values": [
      {
        "name": "width",
        "id": 21,
        "restrictions": {
          "min-value": 1920,
          "max-value": 1920
        }
      }
    ]
  },
  {
    "name": "height",
    "id": 3,
    "description": "height in pixels",
    "datatype": "integer",
    "values": [
      {
        "name": "height",
        "id": 31,
        "restrictions": {
          "min-value": 1080,
          "max-value": 1080
        }
      }
    ]
  },
  {
    "name": "bitrate",
```

List 3

```
    "id": 4,
    "description": "bitrate in kb/sec",
    "datatype": "integer",
    "values": [
      {
        "name": "bitrate",
        "id": 41,
        "restrictions": {
          "min-value": 3000,
          "max-value": 3000
        }
      }
    ]
  }
]
}
```

As such, in some example implementations, a WDD for generating task flows may include a process descriptor. The process descriptor may include a connection map. The process descriptor may further include an array of function-restrictions objects. Each of the function-restrictions objects may be associated with a function and an instance identifier for the function. As such, some of the functions-restrictions objects in the array may be associated with a same function but different instance identifiers. Further, each of the function-restrictions object may include multiple lower-layer objects for different types of function restrictions. One of these lower-layer objects may be used to describe parameter restrictions of the function instance. Such a parameter restriction objects may include a data structure for describing the parameter restrictions (e.g., List 3). Such a data structure may be similar in form to the configuration descriptor used in the function repository to describe a general function parameter configuration (e.g., List 1).

In some example implementations, a WDD for generating task flows may include a process descriptor. The process descriptor may include a connection map. The process descriptor may further include an array of function-restrictions objects. Each of the function-restrictions objects may be associated with a function. Further, each of the function-restrictions object may include multiple lower-layer objects for different types of function restrictions. One or more of these lower-layer objects may be used to describe parameter restrictions of the function instances of the function. Each of such parameter restriction objects may include a data structure for describing the parameter restrictions (e.g., List 3) for that particular function instance. Such a data structure may be similar in form to the configuration descriptor used in the function repository to describe a general function parameter configuration (e.g., List 1). In such implementation, the array of function-restrictions objects may be associated with different functions (independent of instances). However, the second level restriction objects for different restriction types, such as parameter restrictions objects may be associated with instance identifiers of the function. As such, there may be multiple lower-level restriction objects (e.g., parameter restriction objects) that describe a same type of restrictions, but for different instances of the function.

Figure 4:
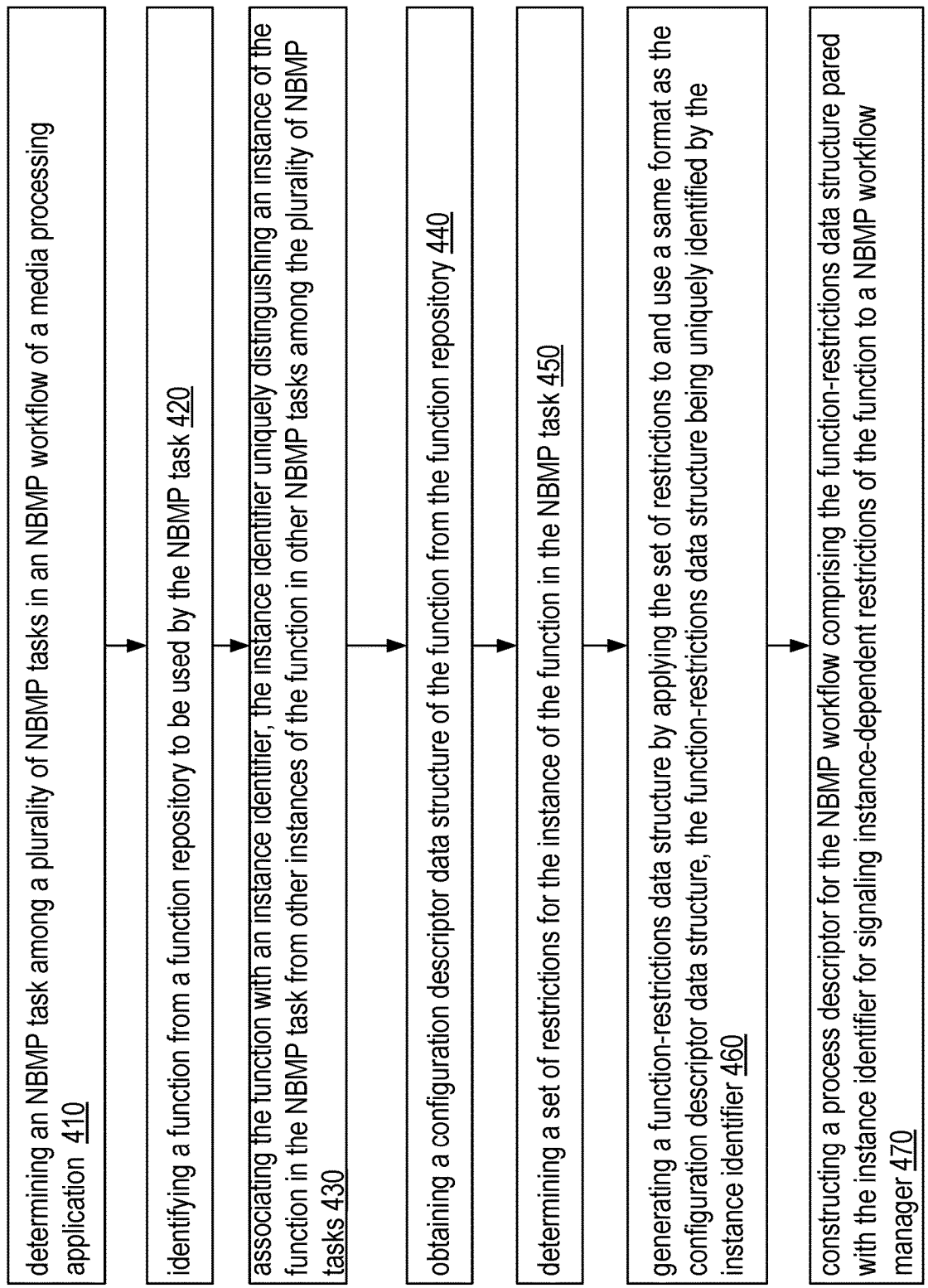
FIG. 4 shows an example data and logic flow according to one or more embodiments of the present disclosure.

FIG. 4 shows an example data and logic flow 400 for a signaling method for generating an NBMP workflow in a cloud-based platform for a media processing application. In step 410, an NBMP task among a plurality of NBMP tasks in an NBMP workflow of the media processing application is determined. In step 420, a function from a function repository to be used by the NBMP task is identified. In step

430, the function is associated with an instance identifier, the instance identifier uniquely distinguishing an instance of the function in the NBMP task from other instances of the function in other NBMP tasks among the plurality of NBMP tasks. In step 440, a configuration descriptor data structure of the function from the function repository is obtained. In step 450, a set of restrictions for the instance of the function in the NBMP task is determined. In step 460, a function-restrictions data structure is generated by applying the set of restrictions to and use a same format as the configuration descriptor data structure, the function-restrictions data structure being uniquely identified by the instance identifier. Finally, in step 470, a process descriptor is constructed for the NBMP workflow comprising the function-restrictions data structure pared with the instance identifier for signaling instance-dependent restrictions of the function to an NBMP workflow manager.

Figure 5:
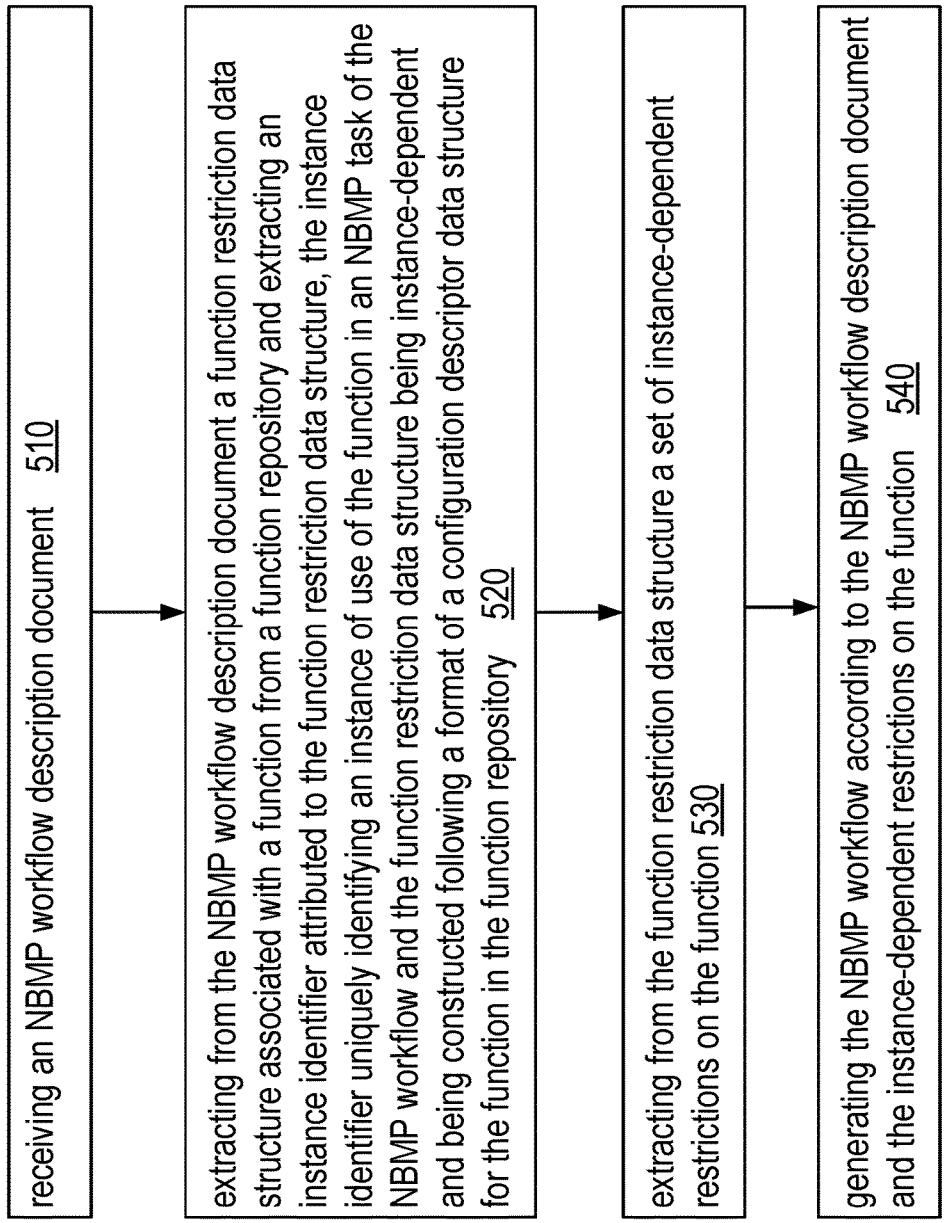
FIG. 5 shows another example data and logic flow according to one or more embodiments of the present disclosure.

FIG. 5 shows another example data and logic flow 500 for generating an NBMP workflow in a cloud-based platform for a media processing application. In step 510, an NBMP workflow descriptor document is received. In step 520, a function restriction data structure associated with a function from a function repository and an instance identifier attributed to the function restriction data structure are extracted from the NBMP workflow description document, the instance identifier uniquely identifying an instance of use of the function in an NBMP task of the NBMP workflow and the function restriction data structure being instance-dependent and being constructed following a format of a configuration descriptor data structure for the function in the function repository. In step 530, a set of instance-dependent restrictions on the function is extracted from the function restriction data structure. In step 540, the NBMP workflow is generated according to the NBMP workflow description document and the instance-dependent restrictions on the function.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A signaling method for generating a Network-Based Media Processing (NBMP) workflow in a cloud-based platform for a media processing application, the method comprising:
    determining an NBMP task among a plurality of NBMP tasks in an NBMP workflow of the media processing application;
    identifying a function from a function repository to be used by the NBMP task;
    associating the function with multiple instance identifiers, each of the multiple instance identifiers being uniquely associated with an instance of multiple instances of the function for distinguishing each of the multiple instances from other instances of the function;
    obtaining a configuration descriptor data structure of the function from the function repository;
    determining multiple sets of restrictions corresponding to the multiple instances of the function;
    generating a function-restrictions data structure comprising multiple parameter restriction objects, each of the multiple parameter restriction objects corresponding to one of the multiple instances of the function and being generated by applying a corresponding set of restrictions of the multiple sets of restrictions to and using a same format as the configuration descriptor data structure, each the multiple parameter restriction objects being uniquely identified by a corresponding instance identifier; and
    constructing a process descriptor for the NBMP workflow comprising the function-restrictions data structure for instance-dependent restriction signaling of the function to an NBMP workflow manager.

2. The signaling method of claim 1, wherein the configuration descriptor data structure comprises a set of instance-independent parameter configurations for the function.

3. The signaling method of claim 2, wherein the set of instance-independent parameter configurations comprise a set of parameter ranges for parameters associated with the function.

4. The signaling method of claim 3, wherein at least one parameter range among the set of parameter ranges comprises a numerical value range.

5. The signaling method of claim 3, wherein at least one parameter range among the set of parameter ranges comprises a set of optional choices.

6. The signaling method of claim 3, wherein the set of restrictions comprise further instance-dependent limitations to the set of parameter ranges.

7. The signaling method of claim 6, wherein at least one of the set of restrictions comprises limiting at least one of the parameters associated with the function to a single numerical value.

8. The signaling method of claim 6, wherein at least one of the set of restrictions comprises limiting at least one of the parameters associated with the function to a single choice.

9. The signaling method of claim 1, further comprising:
    identifying a plurality of functions to be used by the plurality of NBMP tasks from the function repository, usage of each function in each task being attributed to one or more function instance; and
    constructing a connection map of the function instances between the plurality of NBMP tasks.

10. An electronic device for signaling a workflow manger for generating an NBMP workflow in a cloud-based platform for a media processing application, the electronic device comprising a memory for storing instructions and a processor for executing the instructions to:
    determine an NBMP task among a plurality of NBMP tasks in an NBMP workflow of the media processing application;
    identify a function from a function repository to be used by the NBMP task;
    associate the function with multiple instance identifiers, each of the multiple instance identifiers being uniquely associated with an instance of multiple instances of the function for distinguishing each of the multiple instances from other instances of the function;
    obtain a configuration descriptor data structure of the function from the function repository;
    determine multiple sets of restrictions corresponding to the multiple instances of the function;
    generate a function-restrictions data structure comprising multiple parameter restriction objects, each corresponding to one of the multiple instances of the function and generated by applying a corresponding set of restrictions of the multiple sets of restrictions to and using a same format as the configuration descriptor data structure, each the multiple parameter restriction objects being uniquely identified by a corresponding instance identifier; and construct a process descriptor for the NBMP workflow comprising the function-restrictions data structure for instance-dependent restriction signaling of the function to an NBMP workflow manager.

11. The electronic device of claim 10, wherein the configuration descriptor data structure comprises a set of instance-independent parameter configurations for the function.

12. The electronic device of claim 11, wherein the set of instance-independent parameter configurations comprise a set of parameter ranges for parameters associated with the function.

13. The electronic device of claim 12, wherein at least one parameter range among the set of parameter ranges comprises a numerical value range.

14. The electronic device of claim 13, wherein at least one parameter range among the set of parameter ranges comprises a set of optional choices.

15. The electronic device of claim 14, wherein the set of restrictions comprise further instance-dependent limitations to the set of parameter ranges.

16. The electronic device of claim 15, wherein at least one of the set of restrictions comprises limiting at least one of the parameters associated with the function to a single numerical value.

17. The electronic device of claim 15, wherein at least one of the set of restrictions comprises limiting at least one of the parameters associated with the function to a single choice.

18. The electronic device of claim 10, wherein the processor is further configured execute the instructions to:

identify a plurality of functions to be used by the plurality of NBMP tasks from the function repository, usage of each function in each task being attributed to one or more function instance; and construct a connection map of the function instances between the plurality of NBMP tasks.

19. A method for generating an NBMP workflow in a cloud-based platform for a media processing application, the method comprising:

receiving an NBMP workflow description document;

extracting a function-restriction data structure from the NBMP workflow description document, the function-restriction data structure being associated with a function in a function repository;

extracting multiple parameter restriction objects from the function-restriction data structure, each of the multiple parameter restriction objects being associated with an instance identifier of multiple instance identifiers, the instance identifier being attributed to an instance of multiple instances of the function, the instance identifier uniquely identifying the instance of the function among the multiple instances of the function, the multiple parameter restriction objects being constructed following a format of a configuration descriptor data structure for the function in the function repository;

deriving instance-dependent restrictions on the function from the multiple parameter restriction objects;

generating the NBMP workflow according to the NBMP workflow description document and the instance-dependent restrictions on the function.

20. An electronic device for generating a workflow in a cloud-based platform for a media processing application, the electronic device comprising a memory for storing instructions and a processor for executing the instructions to perform the method of claim 19.

* * * * *